US005083428A

United States Patent [19]

Kubomoto et al.

[11] Patent Number: 5,083,428

[45] Date of Patent: Jan. 28, 1992

[54] FLUID CONTROL SYSTEM FOR POWER SHOVEL

[75] Inventors: Wataru Kubomoto; Kazuyuki Doi, both of Hiroshima, Japan

[73] Assignee: Kabushiki Kaisha Kobe Seiko Sho, Kobe, Japan

[21] Appl. No.: 460,108

[22] PCT Filed: Jun. 13, 1989

[86] PCT No.: PCT/JP89/00590

§ 371 Date: Feb. 14, 1990

§ 102(e) Date: Feb. 14, 1990

[87] PCT Pub. No.: WO89/12756

PCT Pub. Date: Dec. 28, 1989

[30] Foreign Application Priority Data

Jun. 17, 1988 [JP] Japan .............................. 63-150515
Sep. 20, 1988 [JP] Japan .............................. 63-236968

[51] Int. Cl.[5] ........................................ F16D 31/02

[52] U.S. Cl. ........................................ 60/421; 60/422; 60/427; 60/428; 60/429; 60/430; 60/486; 91/436; 91/513

[58] Field of Search ................ 60/421, 422, 427, 428, 60/429, 430, 486; 91/436, 461, 513, 518

[56] References Cited

U.S. PATENT DOCUMENTS

| | | | |
|---|---|---|---|
| 3,720,059 | 3/1973 | Schurawski et al. | 60/421 |
| 3,922,855 | 12/1975 | Bridwell et al. | 60/421 |
| 4,030,623 | 6/1977 | Bridwell et al. | 60/421 X |
| 4,078,681 | 3/1978 | Field | 60/421 X |
| 4,210,061 | 7/1980 | Bianchetta . | |
| 4,434,708 | 3/1984 | Bowden | 91/436 |
| 4,570,441 | 2/1986 | Yoshida et al. | 60/421 |

FOREIGN PATENT DOCUMENTS

| | | |
|---|---|---|
| 2736804 | 4/1978 | Fed. Rep. of Germany . |
| 107568 | 9/1978 | Japan . |
| 80152 | 6/1985 | Japan . |
| 165428 | 7/1986 | Japan . |
| 107124 | 5/1987 | Japan . |
| 278302 | 12/1987 | Japan . |

*Primary Examiner*—Edward K. Look
*Assistant Examiner*—Todd Mattingly
*Attorney, Agent, or Firm*—Oblon, Spivak, McClelland, Maier & Neustadt

[57] ABSTRACT

A control system having a flow-dividing selector valve mechanism (52) for changing the channels for causing a pressure fluid to flow from two main pumps (40), (50) into two control valve groups (60), (70) therethrough, and confluent selector valve mechanisms (80), (90) for causing the pressure fluid flowing into each group to flow into a working device control valve of the other group. The confluent selector valve mechanism (80) of the group wherein the working device control valve (62) has a need to compensate for the flow of fluid thereinto cancels the confluence function. The system has a mechanism for restricting the stroke of the spool of a working device control valve (160) to be subjected to varying loads to cause the fluid discharged from the actuator connected thereto to flow into the actuator again when the load is small. A sequence valve (170) operates the spool stroke restricting mechanism (190) by a pilot primary pressure.

24 Claims, 4 Drawing Sheets

FLUID CONTROL SYSTEM FOR POWER SHOVEL

TECHNICAL FIELD

The present invention relates to fluid control systems for civil engineering working machines, especially for power shovels for use in excavation and like work, and more particularly to a fluid control system for causing a power shovel to efficiently perform work by traveling the body of the machine and effecting a single movement or two or more simultaneous movements of the working device.

BACKGROUND ART

Generally, fluid control systems for power shovels are adapted to control the running of the machine body and the pivotal movement and swiveling of the boom, arm and bucket by supplying a pressure fluid from two main pumps to actuators, such as a pair of running motors, boom cylinder, arm cylinder and swivel motor, via opposite running control valves and working device control valves for the boom, arm, bucket and swivel body. These control valves are divided into two groups so as to be easily operable at the same time.

Since power shovels are used for work on large and small scales as working machines in place of manual work, they are operated in a wider variety of modes. The operations of the power shovel include, for example, running only, a single movement of the boom, arm, bucket or swivel body with the machine body in a fixed position, and horizontal excavation or work on slopes wherein the forward end of the shovel is moved along a horizontal surface or the slope through two or more simultaneous operations. In any of these cases, it is required to operate the power shovel efficiently. Further with the power shovel, the working device, especially the boom and the arm, must be moved powerfully and rapidly, so that when the boom or the arm is to be moved, the fluid discharged from the two main pumps needs to be supplied as a confluent flow to the actuator concerned. Further when the working device is to be operated during running, the machine body must be made to run straight.

To fulfill these requirements, Unexamined Japanese Patent Publication SHO 62-107124 discloses a fluid control system, which comprises a first boom control valve for supplying the pressure fluid from one of two main pumps to the boom cylinder, and a second boom control valve for supplying the pressure fluid from the other main pump, as joined with the fluid from the first-mentioned pump, to the boom cylinder. Similarly, the system includes a first arm control valve and a second arm control valve for the arm cylinder. One of two running control valves, the first boom control valve, a bucket control valve and the second arm control valve form a control valve group, and the other running control valve, the first arm control valve and the second boom control valve form another control valve group. Further to enable the machine body to run straight, a flow-dividing selector valve (pilot directional control valve) is provided between the two main pumps and the two control valve groups.

When the power shovel having the conventional fluid control system described is caused to run only, the pressure fluid discharged from the main pumps is supplied to the running control valves independently of each other by the flow-dividing selector valve. When one of the working device actuators is to be operated simultaneously with running, the pressure fluid is supplied from one of the main pumps to the opposite running control valves, and the pressure fluid from the other main pump is supplied to the control valve for the actuator, whereby the power shovel is maintained in straight travel. When the boom cylinder is to be moved, the first and second two boom control valves are operated, such that the pressure fluid flows from the two main pumps are passed through the two boom control valves and supplied as joined together to the boom cylinder. Thus, the boom cylinder, i.e., the boom, is operated powerfully and rapidly. The arm is moved also in the same manner.

With the conventional fluid control system, however, the first and second two control valves are necessary for the boom cylinder, as well as for the arm cylinder. Each of these control valves must be a three-position directional control valve which is operable with high accuracy for flow control and which is therefore complex in construction and costly. Further when the pressure fluid portions from the two main pumps are to be joined together and supplied to the boom cylinder or arm cylinder, the pressure fluid portion flowing from one of the main pumps into the first control valve and the fluid portion flowing from the other main pump into the second control valve are joined together by piping provided externally of the control valve groups and then supplied to the cylinder. Accordingly, the external piping is complex in construction and is likely to permit leakage of the fluid at the piping joint. Further with the fluid control system described, the first boom control valve and the second arm control valves are connected in parallel with each other, and the first arm control valve and the second boom control valves are connected in parallel with each other, so that in the case where the boom cylinder and the arm cylinder are operated at the same time, the control system is influenced by the weight of the working device, e.g., of the boom, arm, etc. or encounters variations in excavation resistance. The pressure fluid is therefore likely to flow into the actuator of smaller load, with the result that the actuator of greater load operates less effectively.

Further with the power shovel, the load on the working device actuators is likely to vary greatly with the work to be performed. Accordingly, it is required to operate the actuator rapidly when the load is small. A fluid control system so adapted is known which includes a working device control valve having a spool and in which when the load is small, the spool stroke is restricted to a position, and at this position, the fluid discharged from the actuator is caused to flow into the actuator again.

The known control system is so designed that the stroke of the control valve spool is restricted with use of a pilot pressure delivered from the secondary side of a pilot valve for changing over the control valve. However, the pilot pressure varies with the amount of control of the pilot valve and is unstable, consequently making the spool stroke restricting position unstable and failing to permit the fluid to flow into the actuator with stability to cause hunting of the actuator.

An object of the present invention is to overcome the foregoing problems of the prior art and to provide a fluid control system for operating a power shovel efficiently, the control system being adapted to automatically divide or join within a control valve group a pressure fluid from two main pumps by changing over the desired control valve so as to supply the fluid to an actuator with use of simplified external piping and with a reduced likelihood of the fluid leaking, the control system further enabling the machine to run straight effectively, permitting a working device actuator, such as a boom cylinder or arm cylinder, to operate singly with an increased speed, and also permitting at least two working device actuators, such as the boom cylinder and arm cylinder, to operate simultaneously and properly at a definite speed ratio.

Another object of the present invention is to provide a fluid control system for a power shovel which system is adapted to operate a working device actuator, such as arm cylinder, to be subjected to varying loads by causing a pressure fluid discharged from the actuator to flow into the actuator again for reuse when the load is small to operate the actuator at an increased speed and to reuse the fluid with good stability while preventing the actuator from hunting, the control system further being adapted to operate the actuator powerfully with an increased pressure without reusing the fluid when the actuator is heavily loaded.

DISCLOSURE OF THE INVENTION

The present invention provides a fluid control system which comprises two main pumps, two control valve groups each having a running control valve at the upstream side thereof and working device control valves arranged downstream from the control valve, a flow-dividing selector valve mechanism selectively operable and having a first position where main channels in communication with the respective main pumps individually communicate with the respective running control valves each at the upstream side thereof and a second position where the main channel is allowed to communicate with the two running control valves and the other main channel is allowed to communicate downstream from the two running control valve with the working device control valves each at the upstream side thereof, confluent selector valve mechanisms each connected to an intermediate portion of a channel extending from the downstream side of the running control valve of each control valve group to the upstream side of the working device control valve of the other control valve group and having its channel opened or closed by a signal for operating the working device control valve of the other control valve group to selectively perform a confluence function or blocking function, a reservoir, and shutoff valve mechanisms each connected to an intermediate portion of a fluid return channel extending from the downstream side of the working device control valve in the most downstream position in each group to the reservoir, the confluent selector valve mechanism of the group wherein the working device control valve has a need to compensate for the amount of flow of the fluid thereinto has a confluent selector valve provided with a receiving portion for cancelling the confluence function in response to a signal for operating the working device control valve.

According to the present invention, the control valves of the control valve groups, the flow-dividing selector valve mechanism, the confluent selector valve mechanisms and the shutoff valve mechanisms are joined together in the form of a valve unit.

The flow-dividing selector valve mechanism has a flow-dividing selector valve provided with a receiving portion for changing over this valve to the second position in response to a signal for operating the two running control valve and one or more working device control valves at the same time and for otherwise holding the valve in the first position. The flow-dividing selector valve has a restrictor for maintaining in the second position communication between an internal passage communicating with one of the main pumps and an internal passage communicating with the other main pump. The flow-dividing selector valve comprises a pilot two-position directional control valve which is changed over to the second position when a pilot pressure input is given to a receiving portion and is otherwise held in the first position.

The confluent selector valve mechanisms of the control valve groups have confluent selector valves each performing the confluence function when receiving a signal for operating the working device control valve belonging to the other group and having a need for an increased amount of flow of the fluid thereinto and otherwise performing the blocking function. Each of the confluence selector valves is a valve selectively operable and having a second position for opening an internal passage to perform the confluence function and a first position for closing the internal passage to perform the blocking function Each confluence selector valve is a pilot two-position blocking valve which is changed over to the second position when a pilot pressure input is given to a receiving portion thereof and is otherwise held in the first position.

The shutoff valve mechanisms of the control valve groups each have a shutoff valve which is changed over to a second position for closing an internal passage when a receiving portion thereof receives a signal for operating the working device control valve belonging to the other group and having a need for an increased amount of flow of the fluid thereinto and is otherwise held in a first position for opening the internal passage. The shutoff valve is a pilot two-position valve which is changed over to the second position to open the internal passage when a pilot pressure input is given to the receiving portion and is otherwise held in the first position to close the internal passage.

According to the invention, the working device control valves comprise a boom control valve communicating with a boom cylinder, a bucket control valve communicating with a bucket cylinder, an arm control valve communicating with an arm cylinder, and a swivel control valve communicating with a swivel motor unit.

According to the invention, one of the control valve groups comprises one of the running control valve, the boom control valve and the bucket control valve, and the other control valve group comprises the other running control valve, the arm control valve and the swivel control valve.

According to the invention, the working device control valve having a need for an increased amount of flow of the fluid thereinto is a boom control valve communicating with a boom cylinder. The confluent selector valve mechanism performs the confluence function in response to a control signal to be sent to the boom control valve for a change-over to the position to stretch the boom cylinder. Further the working device control valve having a need for an increased amount of flow of the fluid thereinto is an arm control valve communicating with an arm cylinder. The confluent selector valve mechanism performs the confluence function in response to a control signal to be sent to the arm control valve for a change-over to the position to contact the arm cylinder. Each of the working device control valves is a three-position pilot blocking valve operable by a pilot pressure According to the invention, the working device control valve having a need to compensate for the amount of flow of the fluid thereinto is a boom control valve communicating with a boom cylinder The confluent selector valve mechanism of the control valve group including the boom control valve has a receiving portion for cancelling the confluence function in response to a signal for a change-over to a position where the amount of flow of the fluid into the boom control valve needs to be compensated for.

The main pumps are each a variable capacity pump to be driven by an engine.

The fluid control system of the present invention further has a pilot pump, pilot channels each communicating with the pilot pump through a restrictor, directional control valves operatively connected to the respective running control valves, and directional control valves operatively connected to the working device control valves respectively, each of the directional control valves operatively connected to the respective running control valves being a valve selectively operable, having its internal passage closed when neutral and having its internal passage opened when in a changed-over position, each of the directional control valves operatively connected to the respective working device control valves being a valve selectively operable, having its internal passage opened when neutral and having its internal passage closed when in a changed-over position, the directional control valves being connected to the respective pilot channels in tandem, the system further having pilot channels for delivering from the downstream side of the directional control valves operatively connected to the respective running control valves a pilot pressure for changing over the flow-dividing selector valve mechanism to the second position.

According to the present invention, a working device control valve communicating with an actuator to be subjected to varying loads has a control valve spool selectively shiftable to one of a neutral position, one work position and another work position, and receiving portions for shifting the spool from the neutral position to either of the work positions. The control valve has toward the above-mentioned one work position side a first work position provided with an internal passage for the discharged fluid from the actuator to flow therethrough into the actuator again, and a second work position provided with an internal passage for the discharged fluid to return therethrough to the reservoir.

The working device control valve has a spool stroke restricting mechanism for restricting the shift of the spool toward the above-mentioned one work position side to the first work position. The working device control valve is a pilot control valve wherein the spool is shiftable by a pilot pressure input given to each of the receiving portions and has a pilot channel connected to a receiving portion of the spool stroke restricting mechanism, a pilot pump in communication with this pilot channel through a restrictor, and a sequence valve connected between the pilot channel and the reservoir and switchable between a first position for permitting a pilot channel downstream from the restrictor to communicate with the reservoir and a second position for blocking the communication. The sequence valve has a receiving portion for holding the sequence valve in the first position when the pressure of the main channel is not lower than a predetermined pressure and for switching the sequence valve to the second position when the channel pressure is lower than the predetermined pressure, the receiving portion being connected to a pilot channel branching from a channel communicating with the main pump at the upstream side of the control valve for deriving the pressure of the main channel.

The fluid control system of the invention for use in power shovels has the following advantages.

When the power shovel is merely caused to run, the fluid discharged from the two main pumps is supplied to the opposite running control valves individually, enabling the machine to run straight. When one of the working device control valves is changed over to operate the contemplated working device actuator during the travel of the power shovel, the fluid discharged from one of the main pumps is divided and supplied to the opposite running control valves, and the fluid from the other main pump is supplied to the changed-over working device control valve, whereby the working device is operated simultaneously with the travel smoothly while permitting the machine to run straight. Further when the working device actuator of one of the control vavle groups is operated simultaneously with running, the portion of fluid separated by the flow-dividing selector valve mechanism from the fluid discharged from the other main pump is supplied to the actuator, while the other divided fluid portion is allowed to flow into the other control valve group and then returned by the confluent selector valve mechanism of the other group to the actuator of said one group to join the first-mentioned fluid portion. Thus, the other fluid portion is prevented from returning to the reservoir for the effective use of the pressure fluid.

Further when only the working device actuator of one of the control valve groups is to be operated, the fluid discharged from the main pump of the group and the fluid discharged from the main pump of the other group are automatically joined together and supplied to the actuator by the confluent selector valve mechanisms and the shutoff valve mechanisms, with the result that the actuator is rapidly operated by a large amount of combined flow of the fluid. Further when the working device actuators of each of the control valve groups are to be operated at the same time, the confluence function of the confluent selector valve mechanism is automatically cancelled, and the fluid discharged from the main pump of the same control valve group is supplied to the actuators individually through the control valves of the same group. Further when the actuator subjected to a great load and the actuator subjected to a small load are to be operated at the same time, the pressure fluid from the main pump is prevented from flowing only into the actuator of small load, with the amount of flow into the actuator of great load compensated for, with the result that the actuators are operated at the same time easily and properly.

Moreover, the control valves of the valve groups, the flow-dividing selector valve mechanisms, confluent selector valve mechanisms and the shutoff valve mechanisms are joined together in the form of a valve unit, so that the fluid is divided and the flows of fluid are joined together inside the valve unit. Accordingly, the external piping can be simplified in construction unlike the conventional case wherein flows of fluid are joined together by external piping. Additionally, the fluid control system is adapted to perform the confluence function using the confluent selector valve mechanisms which are simple in construction without the need to use the second arm control valve and the second boom control valve which are complex in construction. This assures diminished fluid leakage and improved control accuracy.

The pilot pressure is produced by a directional control valve operatively connected to the control valve. This assures a smooth change-over of the valve mechanism.

When the working device actuator to be subjected to varying loads is to be operated, the spool stroke of the control valve therefor is automatically restricted to the first work position when the load is small, and the fluid discharged from the actuator is joined with the supply fluid from the main pump at this position and caused to flow into the actuator again to rapidly operate the actuator under the small load. At this time, the control valve stroke restricting mechanism is caused to function by the pilot pressure (primary pressure) derived via the pilot pump to reliably restrict the stroke. The discharged fluid is therefore controllable stably. When the load on the actuator is great, the restricting function of the stroke restricting mechanism is automatically cancelled to cancel the reuse of the fluid from the actuator and to operate the actuator with agreat force. At this time, no pilot pressure acts on the receiving portion of the stroke restricting mechanism. This obviates the likelihood that the spool will move unstably axially thereof and permits the spool to be held in the second work position reliably to preclude the actuator from hunting.

BEST MODE OF CARRYING OUT THE INVENTION

The present invention will be described in detail with reference to the accompanying drawings.

Figure 1:
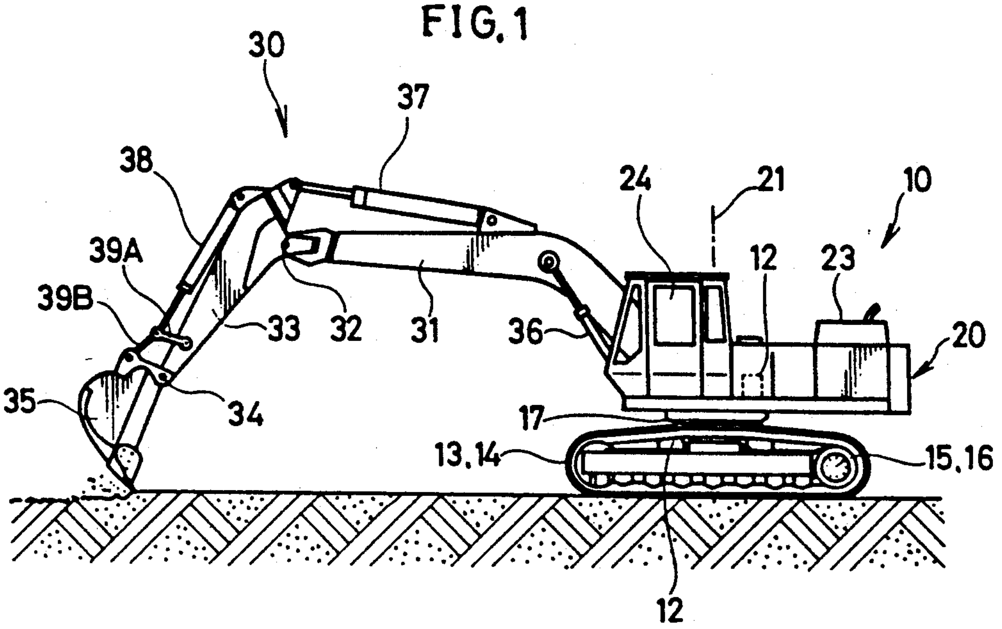
FIG. 1 is a view showing a power shovel having a fluid control system of the invention as it is used for horizontal excavation.
Figure 2:
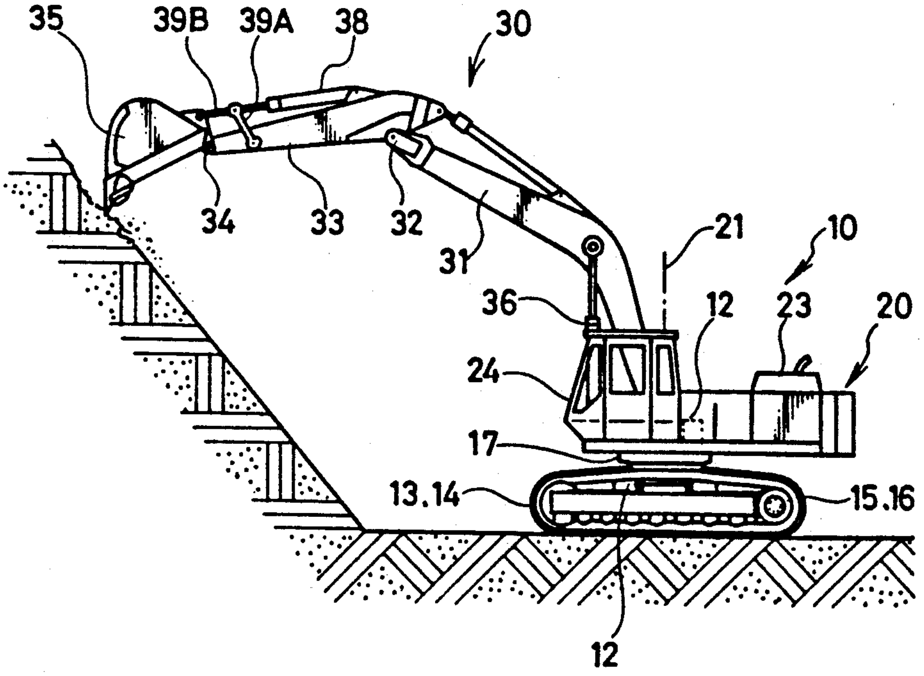
FIG. 2 is a view showing the power shovel of FIG. 1 as it is used for work on slope.

FIGS. 1 and 2 show a civil engineering working machine such as a power shovel 10. The working machine is used for horizontal excavation as seen in FIG. 1, for working on slopes as shown in FIG. 2 or for other civil engineering work. The power shovel 10 comprises a lower running body 12 having a pair of crawlers or like running means 13, 14 at its opposite sides, an upper swivel body 20 mounted on the lower running body 12 by a known rotary support mechanism 17 so as to swivel about a vertical axis 21 on the running body 12 in either direction within a limited range, and a working device 30 attached to the swivel body 20 for use in excavation. The swivel body 20 has an engine 23 for giving power for excavation and power for running, and a driver's compartment 24. The working device 30 comprises a boom 31 movably supported by a horizontal pivot (not shown) on the swivel body 20, an arm 33 movably connected to the forward end of the boom 31 by a horizontal pivot 32, and a bucket 35 movably attached to the forward end of the arm 33 by a horizontal pivot 34.

The power shovel 10 has the following actuators for operating its components for excavation or like work. The running body 12 has known running motor units 15, 16 for driving the running means 13, 14. A known swivel motor unit 22 is provided between the swivel body 20 and the running body 12 for swiveling the swivel body 20 on the running body 12 about the vertical axis 21. A boom cylinder 36 is connected between the swivel body 20 and the boom 31 for moving the boom 31 about the unillustrated horizontal pivot. An arm cylinder 37 is connected between the boom 31 and the arm 33 for moving the arm 33 about the horizontal pivot 32. For moving the bucket 35 about the horizontal pivot 34, a bucket cylinder 38 is connected to the arm 33 and to a bucket 35 using links 39A, 39B.

The running means 13, 14 are driven forward or rearward by rotating the running motor units 15, 16 forward or reversely, whereby the power shovel 10 is propelled forward or rearward. The boom cylinder 36, when contracted or stretched, moves the boom 31 about the horizontal pivot, thereby raising or lowering the arm 33 and the bucket 35. The arm cylinder 37, when stretched or contracted, moves the arm 33 about the horizontal pivot 32, thereby moving the forward end of the arm 33 and the bucket 35 toward or away from the machine body. The bucket cylinder 38, when stretched or contracted, moves the bucket 35 about the horizontal pivot 34. The swivel motor unit 22, when rotated forward or reversely, rotates the swivel body 20 about the vertical axis 21 together with the boom 31, the arm 33 and the bucket 35 which are connected to the body 20. The travel of the machine body, upward or downward movement of the boom 21, outward or inward movement of the arm 33, pivotal movement of the bucket 35 and swiveling are effected singly, or a plurality of such movements are effected at the same time to perform excavation or like work. For working, the operation of the components is controlled by a fluid control system of the present invention.

Figure 3:
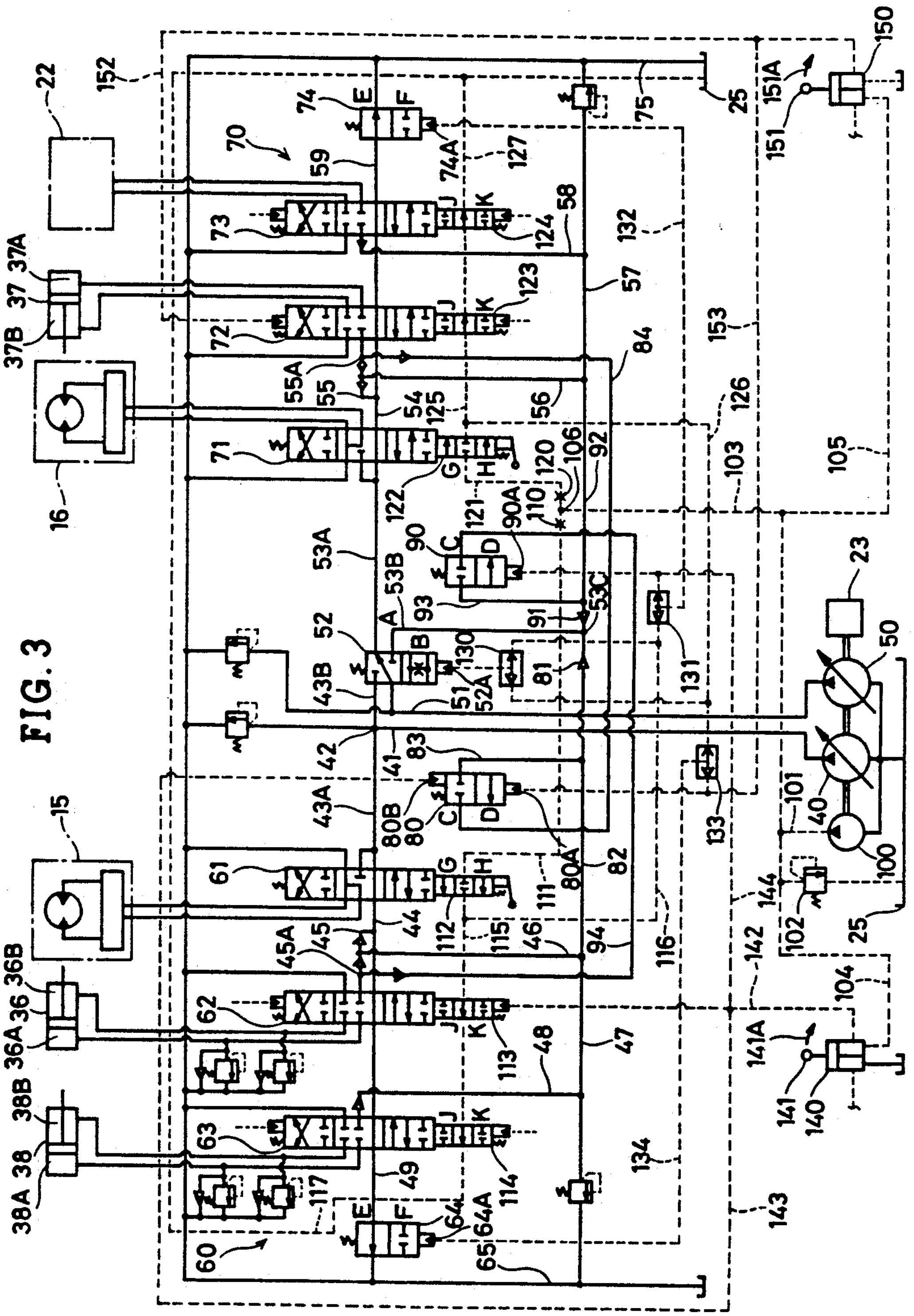
FIG. 3 is a diagram showing the fluid control system of the power shovel of FIGS. 1 and 2.

FIG. 3 shows the fluid control system for efficiently operating the components of the power shovel shown in FIGS. 1 and 2. The control system comprises a reservoir 25, main pumps 40, 50, a pilot pump 100 and valve means for controlling the operation of the above actuators. The valve means are divided into two control valve groups 60, 70. One of the groups, 60, comprises a control valve 61 for controlling the supply of a fluid to and discharge of the same from the running motor unit 15, a control valve 62 for controlling the supply and discharge of the fluid for the fluid chambers 36A, 36B of the boom cylinder 36, and a control valve 63 for controlling the supply and discharge of the fluid for the fluid chambers 38A, 38B of the bucket cylinder 38. The other group 70 comprises a control valve 71 for controlling the supply and discharge of the fluid for the other running motor unit 16, a control valve 72 for controlling the supply and discharge of the fluid for the fluid chambers 37A, 38B of the arm cylinder 37, and a control valve 73 for controlling the supply and discharge of the fluid for the swivel motor unit 22.

In the groups 60 and 70, the running control valves 61, 71 are disposed at the upstream side of the respective groups 60, 70. Provided at the downstream side thereof are the control valves for the working device, i.e., the boom and bucket control valves 62, 63 and the arm and swivel control valves 72, 73 which are arranged in parallel to the respective control valves 61, 71. A channel 45 branching from a channel 44 extending from the downstream side of the running control valve 61 is connected to the inlet side of the boom control valve 62 and also to the inlet side of the bucket control valve 63 via channels 46, 47, 48. Similarly, a channel 54 extending from the downstream side of the running control valve 71 is connected to the inlet side of the arm control Valve 72 and also to the inlet side of the swivel control valve 73 via channels 56, 57, 58.

The running control valves 61, 71 are each a three-position directional control valve having a spool which is manually shiftable by a lever. Each of the working device control valves 62, 63, 72, 73 is a pilot-operated three-position directional control valve which is operated by pilot pressure applied to the receiving portion thereof.

To produce pilot pressure for operating the working device control valves, the pilot pump 100 is connected along with the main pumps 40, 50 to the engine 23. A primary pressure channel 101 communicating with the discharge side of the pilot pump 100 conducts therethrough the pressure fluid (primary pressure) having its pressure adjusted by a pilot relief valve 102. Channels 104, 105 branching from the channel 101 are connected respectively to the primary side of a pilot valve 140 for the boom and the same side of a pilot valve 150 for the arm. A pilot channel 142 connected to one of the primary sides of the valve 140 is in communication with one of the receiving portions of the control valve 62. The valve 140 has a lever 141 which, when moved in the direction of arrow 141A, causes the valve 140 to deliver the pilot pressure to the channel 142, changing over the control valve 62 to extend the boom cylinder 36. A pilot channel 152 connected to one of the primary sides of the pilot-operated valve 150 is in communication with one of the receiving portions of the control valve 72. The valve 150 has a lever 151 which, when moved in the direction of arrow 151A, causes the valve 150 to deliver the pilot pressure to the channel 152, changing over the control valve 72 to stretch the arm cylinder 37. When the levers 141, 151 are shifted to a direction opposite to the direction of arrows 141A, 151A, the respective control valves 62, 72 are changed over to a position opposite to the above position. The other control valves 63, 73 are each changed over by an unillustrated pilot valve in the same manner as above.

The fluid control system of the present invention has a flow-dividing selector valve mechanism for maintaining the machine in straight travel under any work condition. The machine can be caused to run straight by supplying the fluid to the opposite running motor units 15, 16 at equal flow rates.

The flow-dividing selector valve mechanism has a flow-dividing selector valve 52, which is connected to the following channels. A main channel 41 in communication with the main pump 40 is divided at a point 42 into left and right branch channels 43A, 43B. One of the branch channels, 43A, is connected to the inlet side of the control valve 61 at the upstream side of the group 60. The other branch channel 43B and a main channel 51 communicating with the main pump 50 are connected respectively to two inlet ports of the selector valve 52. This valve 52 has two outlet ports connected respectively to channels 53A, 53B.

The flow-dividing selector valve 52 is a pilot-operated two-position directional control valve which is usually in a position A, holding the channel 51 in communication with the channel 53A, and which is changed over to a position B when a pilot pressure input is given to a receiving portion 52A to cause the channel 43B to communicate with the channel 53A and the channel 51 to communicate with the channel 53B. The selector valve 52 has at the position B a restrictor through which an internal passage holding communication between the channels 43B and 53A communicates with an internal passage holding communication between the channels 51 and 53B. The restrictor serves for the channels 53A, 53B, correcting the flow pressure fluid toward the high-pressure side and replenishing the low-pressure side with the pressure fluid.

The channel 53A is connected to the inlet side of the control valve 71. The other channel 53B is divided at a point 53C into channels 82 and 92, which are provided with check valves 81, 91 for preventing the fluid from flowing from each of these channels reversely toward the other channel and toward the channel 53B. The channel 82 is connected in parallel with the control valves 62, 63 each at its inlet side by the channels 46 to 48. The channel 92 is connected in parallel with the control valves 72, 73 each at its inlet side by the channels 56 to 58.

The fluid control system of the present invention has a confluent selector valve mechanism and a shutoff valve mechanism for use in operating the working device actuators of one of the groups for supplying the pressure fluid from the two main pumps 40, 50 as a confluent flow to the actuators, whereby the actuators are made to operate powerfully and rapidly.

The shutoff valve mechanism has shutoff valves 64, 74 which are provided respectively between channels 49, 59 and channels 65, 75 for return to the reservoir 25. The channels 49, 59, which are disposed in the most downstream position of the respective groups 60, 70, communicate with the respective upstream channels 43A, 53A through a bypass channel when the control valves 61, 62, 63 and the control valves 71, 72, 73 are neutral. The shutoff valves 64, 74 are each a pilot-operated two-position directional control valve and are usually in an open position E where the internal passage thereof is open, permitting the channels 49, 59 to communicate with the respective return channels 65, 75. When a pilot pressure input is given to their receiving portions 64A, 74A, these valves 64, 74 are changed over to a closed position F where the internal passage is closed.

The confluent selector valve mechanism has confluent selector valves 80, 90. Each of these valves is a pilot two-position blocking valve having its internal passage opened and closed in response to a pilot pressure input given to receiving portions thereof. The selector valve 80 is interposed between a channel 83 communicating with the branch channel 82 of the group 60 and a channel 84 communicating with the inlet side of the control valve 72 of the other group 70. The selector valve 80 has two receiving portions 80A, 80B. The portion 80A has connected thereto a pilot channel 153 branching from the pilot channel 152 connected to the secondary side of the pilot valve 150 for the arm. The other receiving portion 80B has connected thereto a pilot channel 143 branching from the pilot channel 142 connected to the secondary side of the pilot valve 140 for the boom. The valve 80 is usually in a closed position C with its internal passage closed. In response to a pilot pressure input given to the receiving portion 80A, the valve 80 is changed over to an open position D to cause the channel 83 to communicate with the channel 84. When in the open position D, the valve 80 is returned to the closed position C to close the internal passage in response to a pilot pressure input given to the receiving portion 80B. The selector valve 90 is provided between a channel 93 communicating with the branch channel 92 of the group 70 and a channel 94 communicating with the inlet side of the control valve 62 of the group 60. The selector valve 90 has a receiving portion 90A to which is connected a pilot channel 144 branching from the pilot channel 142. The valve 90 is usually in a closed position E with its internal passage closed but is changed over to an open position D to effect communication between the channels 93, 94 in response to a pilot pressure input given to the receiving portion 90A.

The control valves 61 to 63 and 71 to 73 of the groups 60, 70, the flow-dividing selector valve 52, the confluent selector valves 80, 90 and the shutoff valves 64, 74 are joined together in the form of a valve unit and interconnected by internal piping. This simplifies the external piping and diminishes leakage of fluid.

A channel 103 communicating with the pilot pump 100 is branched at a point 106 into pilot channels 111, 121 having restictors 110, 120, respectively. The pilot channel 111 is connected to pilot blocking valves 112, 113, 114 in tandem, and the other pilot channel 121 to pilot blocking valves 122, 123, 124 similarly. The valves 114, 124 communicate with the reservoir 25 via end channels 117, 127, respectively. These valves 112 to 114 and 122 to 124 are known valves which are operatively connected to the control valves 61 to 63 and 71 to 73, respectively. The valves 112, 122 have an internal passage which is closed in a neutral position and opened in a position G or H. The valves 113, 114 and 123, 124 have an internal passage which is open in a neutral position and closed in a position J or K. Pilot channels 116, 126 branch off from pilot channels 115, 125 extending from the downstream side of the valves 112, 122, respectively. The pilot pressures conducted through the two pilot channels 116, 126 are led to a shuttle valve 130, by which the higher pressure is selected and then applied to the receiving portion 52A of the selector valve 52.

Via a shuttle valve 131, the pilot channel 116 and the pilot channel 144 communicating with the secondary side of the pilot valve 140 for the boom communicate with a pilot channel 132, which in turn communicates with the receiving portion 74A of the shut-off valve 74. Further via a shuttle valve 133, the pilot channel 126 and the pilot channel 153 communicating with the secondary side of the pilot valve 150 for the arm communicate with a pilot channel 134, which in turn communicates with the receiving portion 64A of the shutoff valve 64.

The fluid control system shown in FIG. 3 operates in the following manner. Suppose the boom cylinder 36 is to be stretched in the case where the power shovel 10 operates in a fixed position. When the lever 141 of the pilot valve 140 is shifted in the direction of arrow 141A, a pilot pressure is delivered from the valve 140 to the pilot channel 142 to thereby change over the control valve 62 to the stretching position. At the same time, the pilot pressure is applied via the pilot channel 144 to the receiving portion 90A of the selector valve 90 to change over the valve 90 to the open position D. Further via the pilot channel 144, the shuttle valve 131 and the pilot channel 132, the pilot pressure is applied to the receiving portion 74A of the shutoff valve 74 to switch the shuttoff valve 74 to the closed position F. At this time, the pilot pressure is fed via the pilot channel 143 to the receiving portion 80B of the control valve 80, biasing the valve 80 toward the closed position C. It is however noted that the valve 80 is already held in the closed position C by the force of a spring incorporated therein, so that the valve 80 remains in the position C. Further at this time, the upstream control valves 61, 71 of the respective groups are neutral, and the pilot blocking valves 112, 122 are in the neutral closed position, no pilot pressure occurs in the pilot channels 116, 126. Accordingly, the selector valve 52 is held in the position A.

Consequently, the pressure fluid from the main pump 40 flows into the channel 45 via the channels 41, 43A, the neutral position of the control valve 61 and the channel 44. On the other hand, the pressure fluid from the main pump 50 flows through the channel 51, the position A of the selector valve 52, the channel 53A, the neutral position of the control valve 71, the channels 54, 55, 56, 92, 93 and the opened position D of the selector valve 90 into the channel 94. At the point of confluence 45A, the flows of pressure fluid from the main pumps 40, 50 join together, and the confluent fluid is passed through the stretched position of the control valve 62 and supplied to the fluid chamber 36A at the head side of the boom cylinder 36 to extend the boom cylinder 36. The fluid discharged from the fluid chamber 36B at the rod side of the cylinder 36 flows through the above position and then through the return channel 65 and is returned to the reservoir 25. In this way, the boom cylinder is rapidly extended by a large amount of confluent fluid flowing thereinto to rapidly raise the boom 31. The rate of flow into the boom cylinder 36 and the operating speed thereof are controlled by the stroke of the control valve 62 to control the speed of upward movement of the boom 31.

When the arm cylinder 37 is to be contracted, the lever 151 of the pilot valve 150 is shifted toward the direction of arrow 151A to produce a pilot pressure in the pilot channel 152, and the control valve 72 is changed over to the contracting position by the pilot pressure. At the same time, the selector valve 80 is switched to the open position D and the shutoff valve 64 to the closed position F through the same operation as when the pilot valve 140 is operated. The selector valve 52 remains in the position A.

Consequently, the pressure fluid from the main pump 50 is caused to flow into the channel 55 via the channel 51, position A of the selector valve 52, channel 53A, neutral position of the control valve 71 and channel 54. The pressure fluid from the main pump 40 flows into the channel 84 through the channels 41, 43A, neutral position of the control valve 61, channels 44, 45, 46, 82, 83 and opened position D of the selector valve 80 The flows of pressure fluid from the main pumps 40, 50 join together at the point of confluence 55A, and the confluent fluid flows through the contracting position of the control valve 72 into the fluid chamber 37B at the rod side of the arm cylinder 37 to contract the arm cylinder 37. The fluid discharged from the fluid chamber 37A at the head side of the arm cylinder 37 passes through the above position of the control valve 72 and then through the return channel 75 and returns to the reservoir 25. Thus, the arm cylinder 37 is rapidly contracted by a large amount of confluent fluid thereinto to rapidly push the arm 33 outward. The rate of flow into the arm cylinder 37 and the operating speed thereof are controlled by the stroke of the control valve 72 to control the speed of outward pushing movement of the arm 33.

When the pilot valves 140, 150 are reversely operated and also when the control valves 63, 73 are operated forwardly or reversely in the above fluid control system, the actuators concerned are operated by the fluid discharged from either one of the main pumps 40, 50 since no pilot channel is provided for changing over the confluent selector valves 80, 90 and the shutoff valves 64, 74.

Next, suppose the control valves 62, 72 are operated at the same time, that is, suppose the arm cylinder 37 is extended against load while extending the boom cylinder 36 also against load during the operation of the power shovel 10. If the flows of fluid discharged from the main pumps 40, 50 as joined together as stated above then flow into the control valves 62, 72 in parallel, the fluid will flow chiefly into the control valve which is connected to the actuator of smaller load. However, the fluid control system of the present invention is adapted to compensate for the flow of pressure fluid into the control valve 62 connected to the boom cylinder 36 of greater load.

Stated more specifically, when the pilot valves 140, 150 are operated at the same time, the control valves 62, 72 are changed over by the pilot pressure produced in the pilot channels 142, 152. At the same time, the pilot pressure is fed to the receiving portions of the shutoff valves 64, 74 and of the confluent selector valves 80, 90 via the pilot channels 144, 153 branching from the pilot channels 142, 152 and the shuttle valves 131, 133, whereby the shutoff valves 64, 74 are changed over to the closed position F, and the confluent selector valve 90 to the open position D. However, the selector valve 80 remains in the closed position C since the pilot pressure for changing over the control valve 61 is also fed to the receiving portion 80B for cancelling the confluence function of the selector valve 80 at the same time.

As a result, the pressure fluid from the main pump 40 flows into the control valve 62 only to compensate for the flow thereinto. On the other hand, the pressure fluid from the main pump 50 flows into the control valve 72 via the channel 51, position A of the confluent selector valve 52 and channels 53A, 54, 55. At the same time, the fluid acts to flow into the control valve 62 from the channel 55 via the channels 56, 92, 93, open position D of the selector valve 90 and channel 94. Nevertheless, with the control valve 62 in communication with the boom cylinder 36 of great load, the pressure fluid from the main pump 50 substantially entirely flows into the control valve 72 only. Accordingly, the boom and the arm can be operated at the same time with the two actuators therefor automatically held independent of each other. If one of the boom and arm is brought out of operation during simultanous operation, only one of the selector valves 80, 90 is changed over along with only one of the shutoff valves 64, 74, permitting the pressure fluid portions from the main pumps 40, 50 to automatically join together and flow into the control valve held in continued operation to result in an increased work speed.

Next, when the control valves 61, 71 are switched to the forward position or reverse position for causing the machine body to run, the pilot blocking valves 112, 122 are changed over to the position J or K in operative relation with the control valves 61, 71. Accordingly, the fluid (of pilot primary pressure) discharged from the pilot pump 100 flows into the pilot channels 115, 125 via the primary pressure channel 101 and then via the restrictors 110, 120 and pilot channels 111, 121. However, the control valves 62, 63 and 72, 73 downstream from the respective control valves 61, 71 are neutral, the pilot blocking valves 113, 114 and 123, 124 are neutral, and the pilot channels 115, 125 are in communication with the reservoir 25 through the downstream pilot channels 117, 127, so that no pilot pressure occurs in the pilot channels 116, 126. Consequently, the selector valve 52 is held in the position A, and the shutoff valves 64, 74 are held in the open position E. At this time, the rate of flow from the pilot channels 117, 127 into the reservoir 25 is controlled to a very low value by the restrictors 110, 120, with the result that the primary pressure afforded by the pilot pump 100 is compensated for, rendering the pilot valves 140, 150 operable free of trouble When the control valves 61, 71 are thus changed over to either one of the above positions, the pressure fluid from the main pump 40 is supplied to the running motor unit 15 through channels 41, 43A and the changed-over position of the valve 61, and the pressure fluid from the main pump 50 is supplied to the running motor unit 16 through the channel 51, position A of the flow-dividing selector valve 52, channel 53A and the changed-over position of the valve 71. Accordingly, the pressure fluid is supplied from the main pumps 40, 50 to the respective running motor units 15, 16 individually to drive the motors forward or reversely. The fluid discharged from the motor units 15, 16 is returned to the reservoir 25 through the changed-over position of the control valves 61, 71 and through the return channels 65, 75. The running motor units 15, 16, when thus driven, drive the running means 13, 14 to cause the machine body to run. For running, the rate of flow into the running motor units 15, 16 and the drive speed of the crawlers 13, 14 are controlled according to the amount of change-over of the valves 61, 71, while the machine body is held in straight travel.

Next, when one or more of the working device control valves 62, 63, 72, 73 are changed over during running, i.e., with the control valves 61, 71 in the changed-over position, the pilot blocking valves 112, 122 are switched to the position G or H, and one or more of the other pilot blocking valves 113, 114, 123, 124 are switched to the position J or K to block the pilot channel 115 or 125 and thereby produce a pilot pressure in the pilot channel 116 or 126. The higher pilot pressure is selected by the shuttle valve 130 and fed to the receiving portion of the selector valve 52, whereby the valve 52 is changed over to the position B. As a result, the pressure fluid discharged from the main pump 40 into the channel 41 is divided at the branch point 42 to flow into the channels 43A, 43B. One of the divided fluid portions flows into the running motor unit 15 via the control valve 61, and the other fluid portion flows through the channel 43B and then through the position B of the flow-dividing selector valve 52 into the channel 53A and further flows through the control valve 71 into the running motor unit 16.

On the other hand, the pressure fluid discharged from the main pump 50 into the channel 51 flows through the position B of the flow-dividing selector valve 52 into the channel 53B, is then divided at the point 53C and thereafter flows into the upstream side of the control valves 62, 63 and 72, 73 via the check valves 81, 91 and channels 82, 92.

When, for example, the control valve 72 or 73 has been changed over during running, the pilot channel 125 is blocked by the directional control valve 123 or 124 to produce a pilot pressure in the pilot channel 126, and the pilot pressure changes over the shutoff valve 64 to the closed position F Further if the control valve 62 or 63 has been changed over, the pilot channel 115 is blocked by the pilot blocking valve 113 or 114 to produce a pilot pressure in the pilot channel 116, and the shutoff valve 74 is changed over to the closed position F. Consequently, one of the divided pressure fluid portions provided by the main pump 50 through the channel 53B is prevented from returning to the reservoir 25 uselessly via the channel 65 or 75. The pressure fluid from the main pump 50 entirely flows into the operated working device control valve to efficiently operate the actuator communicating with this control valve.

When only one of the boom cylinder control valve 62 and the arm cylinder control valve 72 is operated singly in the embodiment of FIG. 3, the pressure fluid portions from the two main pumps 40, 50 join together and flow into the operated valve. When both the control valves 62, 72, the flow of pressure fluid from the main pump 40 into the boom cylinder control valve 62 is compensated for, and the pressure fluid from the other main pump 50 is supplied to the arm cylinder control valve 72, assuming that the load pressure on the boom cylinder 36 when it is stretched is greater than the load pressure on the arm cylinder 37 when it is contracted.

However, the present invention is not limited to this combination but is applicable for many other purposes, for example, as will be mentioned below. A shuttle valve may be connected to channels branching from pilot channels in communication with the respective receiving portions for switching the control valve 62 to the stretching position and contracting position. The confluent selector valve 80 in the closed position can then be changed over to the closed position again by the higher pilot pressure selected by the shuttle valve. The channel communicating with the arm cylinder 37 can be connected reversely to the illustrated case to change over the confluent selector valve 80 and the shutoff valve 64 with the pilot pressure for operating the valve to stretch the arm cylinder 37. The pilot pressure for operating the control valve 72 forward or reversely can be derived by a shuttle valve for use in changing over the flow-dividing selector valve 52 and the confluent selector valve 80. The working device actuators may be replaced by one another in arrangement in accordance with the load dependent on the kind of work to be performed.

Figure 4:
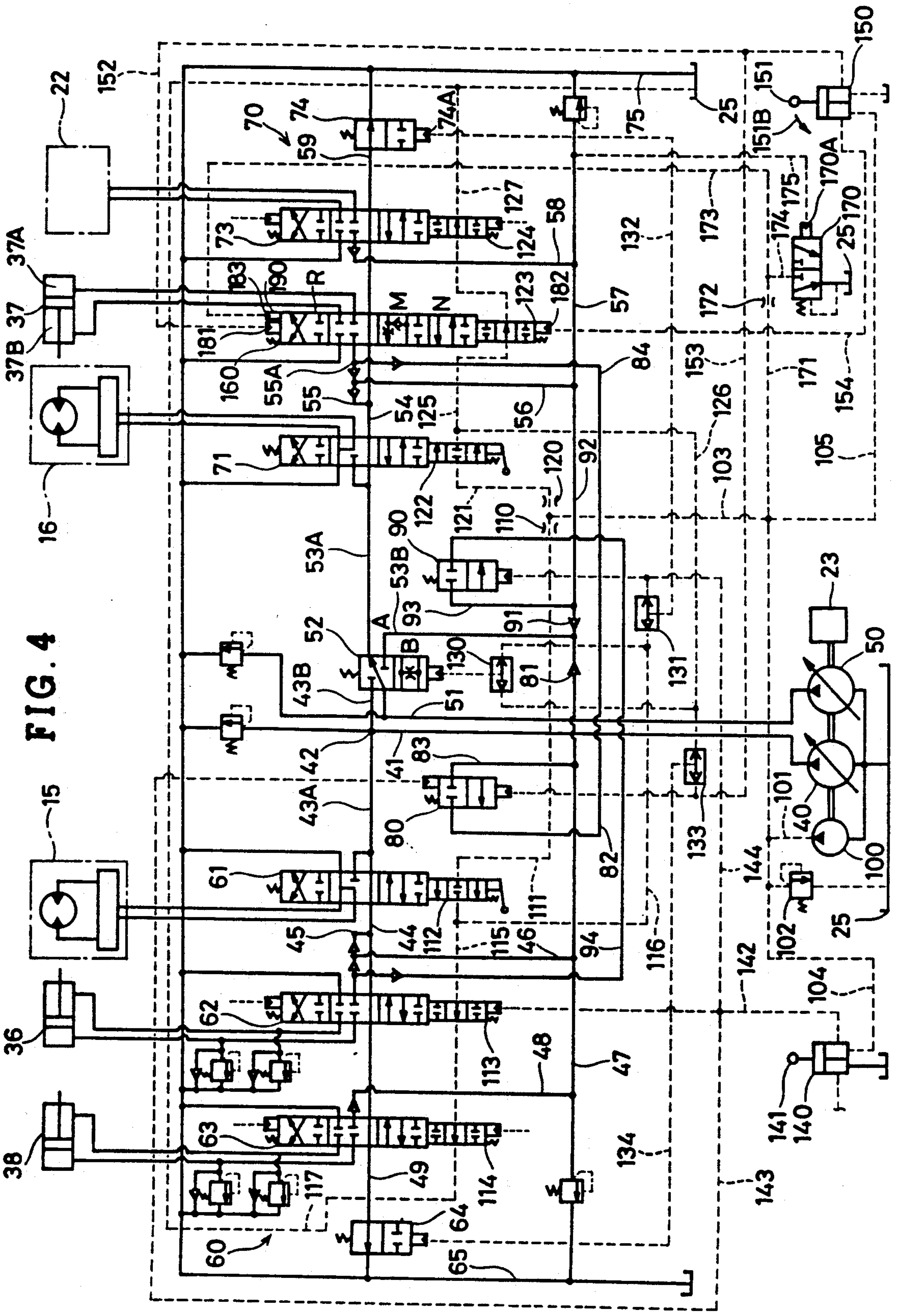
FIG. 4 is a diagram showing a fluid control system having means for reusing the fluid returned from an actuator.

The fluid control system of the present invention has the control function of operating the actuator at a higher speed when the load thereon is small and operating the actuator at a lower speed to produce a greater operating force when it is loaded heavily. This control function can be realized by reusing the fluid discharged from the actuator. FIG. 4 shows such an embodiment.

FIG. 4 shows a fluid control system embodying the invention and having the function of reusing the fluid discharged from the arm cylinder 37. A control valve 160 communicating with the arm cylinder 37 is an improvement of the control valve 72 of the fluid control system of FIG. 3. The control valve 160 is a four-position directional control valve which can be changed over from a neutral position to a contracting position R and extending positions M, N. The stretching position M is a transition position between the neutral position and the stretching position N. Accordingly, the control valve 160 is substantially a three-position directional control valve.

The control valve 160 has a known receiving portion 181 provided toward one end of a spool for shifting the spool to the contracting position R, a known receiving portion 182 provided toward the other end of the spool for shifting the spool to the stretching positions M, N, and a receiving portion 183 provided toward one end of the spool for restricting the stroke of the spool as one of the features of the invention. The pilot channel 152 communicating with one secondary side of the pilot valve 150 is connected to the receiving portion 181. A pilot channel 154 communicating with the other secondary side of the valve 150 is connected to the receiving portion 182. A pilot channel 173 extending through a restrictor 172 from a pilot channel 171 in communication with the pilot pump 100 is connected to the stroke restricting receiving portion 183.

A sequence valve 170 is disposed between a pilot channel 174 communicating with the pilot channel 173 and the reservoir 25. The sequence valve 170 is a two-position directional control valve which is changed over to an open position for causing the channel 174 to communicate with the reservoir 25 when a pressure signal not lower than a predetermined pressure (e.g., 150 kgf/cm$^2$) is fed to the receiving portion thereof and which is otherwise changed over to a closed position for blocking the channel 174. To change over the sequence valve 170, a pilot channel 175 extending from the channel 57 is connected to the receiving portion 170A. The channels 92, 57 are in communication with the upstream side of the control valve 160, and communicates with the main pump 50 when the arm cylinder 37 is operated.

Figure 5:
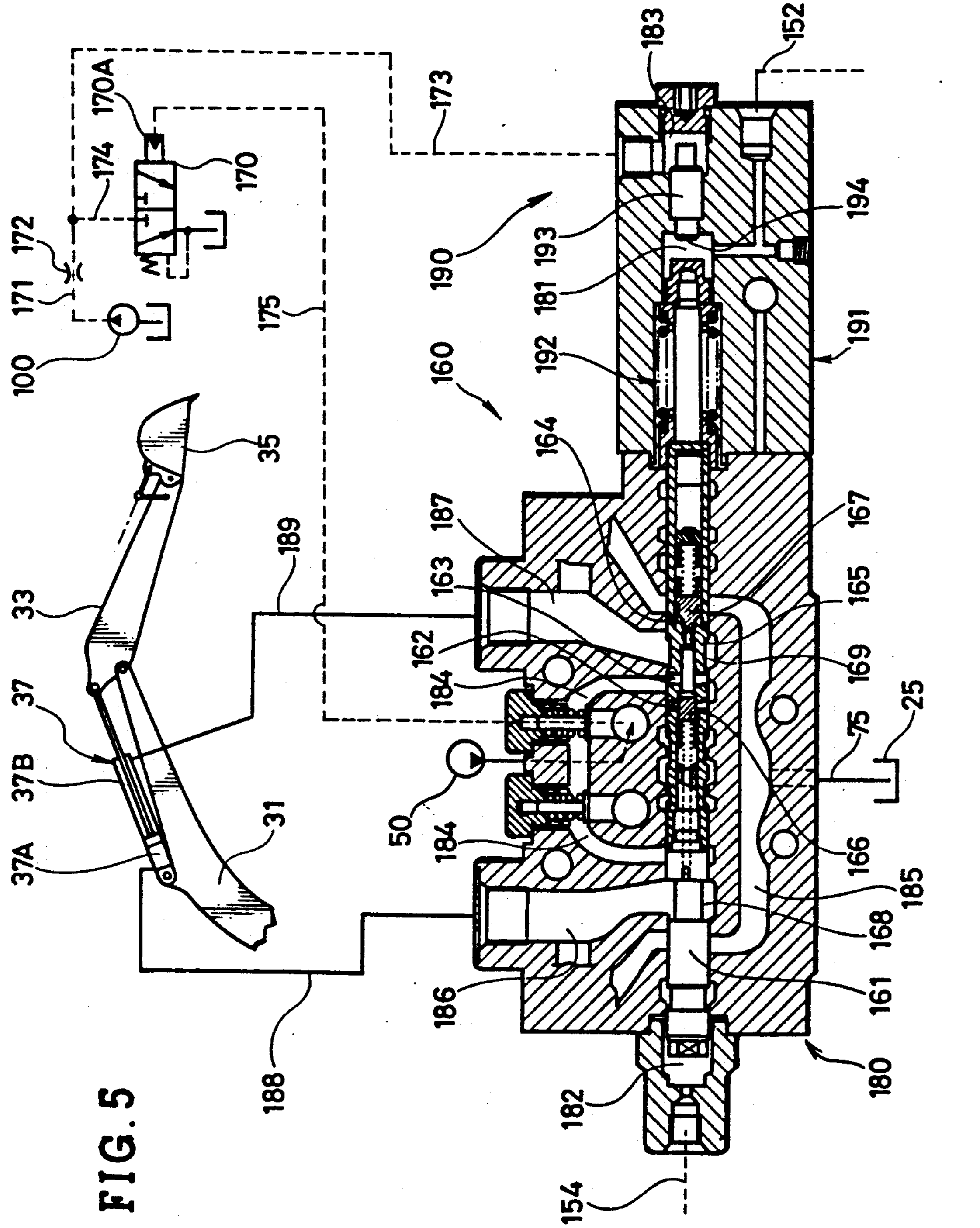
FIG. 5 is a fragmentary view showing the fluid control system of FIG. 4 in greater detail.

FIG. 5 is a view showing the construction of the control valve 160 in detail. With reference to the drawing, the control valve 160 comprises a valve case 180, a spool 161 inserted in the valve case 180 and slidable axially thereof, and a valve cover 191. The valve case 180 has a channel 184 communicating with the main pump 50, a channel 185 communicating with the reservoir 25, and channels 186, 187 communicating with the respective fluid chambers 37A, 37B of the arm cylinder 37. The spool 161 has channels 162, 163, 164, a restrictor 165 and check valves 166, 167. The valve case 180 is provided at its one side with the receiving portion 182 for shifting the spool to the contracting position R and at the other side with a stroke restricting mechanism 190.

The stroke restricting mechanism 190 comprises the valve cover 191 attached to the valve case 180, center spring means 192 provided between the valve cover 191 and the spool 161 for holding the spool 161 at the neutral position, and a stroke restricting piston 193 axially slidably housed in the valve cover 191. The valve cover 191 has the receiving portion (chamber) 181 communicating with the pilot channel 152, and the receiving portion (chamber) 183 communicating with the pilot channel 173. The piston 193 is movable leftward to a position where the shoulder thereof comes into contact with a bottom stepped portion of the chamber 183. At the end of the leftward stroke, the end 194 of the piston 193 projects into the chamber 181 by a predetermined amount.

When a pilot pressure not lower than the predetermined value is acting in the chamber 183, the piston end 194 is held projected, restricting the rightward stroke of the spool 161. At this time, the change-over of the control valve 160 is limited to the first stretching position M. When the spool 161 moves rightward while the pilot pressure acting in the chamber 183 is less than the predetermined value, the end of the spool 161 comes into contact with the piston end 194, and the spool 161 further moves rightward, retracting the piston 193. The end of the spool 163 comes into contact with the bottom of the chamber 181, which restricts the maximum stroke. At this time, the control valve 160 is in the second stretching position N.

With the fluid control system shown in FIGS. 4 and 5, the lever 151 is shifted in the direction of arrow 151B to stretch the arm cylinder 37, whereupon a pilot pressure is delivered from the pilot valve 150 to the pilot channel 154 and fed to the receiving portion 182 of the control valve 160. This moves the spool 161 in the control valve 160 rightward in FIG. 5, causing the channel 184 to communicate with the channel 186 through a reduced diameter portion of the spool 161. At this time, the pressure fluid discharged from the main pump 50 flows into the upstream side of the control valve 160 through the main channel 51, position A of the selector valve 52, channel 53A, neutral position of the control valve 71 and channels 54, 55. The fluid further flows through the channels 184, 186 in the valve 160 and through a channel 188 into the fluid chamber 37A at the head side of the arm cylinder 37.

Consequently, the upstream-side pressure of the control valve 160 builds up in corresponding relation to the load pressure acting in the fluid chamber 37A at the head side of the arm cylinder 37, stretching the arm cylinder 37. Further in this case, the upstream-side fluid pressure of the control valve 160, i.e., the main channel pressure of the fluid discharged from the main pump 50 into the channel 51, acts on the receiving portion 170A of the sequence valve 170 via the channel 56, channel 57 and pilot channel 175.

If the load on the arm cylinder 37 is then small, i.e., if the pressure supplied to the arm cylinder 37 is less than the pressure predetermined for the sequence valve 170, the sequence valve 170 is held in the closed position to block the pilot channel 174. As a result, the pilot pressure (primary pressure) afforded by the pilot pump 100 and led through the pilot channel 171 and restrictor 172 to the pilot channel 173 acts on the stroke restricting receiving portion 183 of the control valve 160, whereby the piston 193 of the stroke restricting mechanism 190 is held projected as stated above, restricting the stroke toward the extend position of the spool 161 of the valve 160 to bring the control valve to the first extending position M. The channel 162 of the spool 161 is now in communication with the channel 184, the channel 163 with the channel 187 and the channel 164 with the channel 185.

Consequently, the fluid discharged from the rod-side fluid chamber 37B of the arm cylinder 37 into the channel 189 with the extending of the cylinder 37 flows into the channels 187, 163 of the control valve 160, then partly flows toward the restrictor 165 to push the check valve 167 open and is thereafter discharged into the reservoir 25 through the channels 164, 185 and channel 75. Owing to the presence of the restrictor 165, however, a major portion of the fluid flowing into the channels 187, 163 flows toward the check valve 166, pushing this valve 166 open, and returns toward the channel 184 via the channel 162 The discharged fluid thus returned joins with the fluid supplied from the main pump 50, and the confluent flow is supplied to the fluid chamber 37A through the channels 186 and 188.

With the fluid discharged from the arm cylinder 37 thus used again, the fluid is supplied to the fluid chamber 37A in a large quantity to stretch the arm cylinder 37 at an increased speed and draw the arm 33 toward the machine body rapidly. The pilot pressure acting on the receiving portion 183 at this time for restricting the spool stroke has been adjusted to a stabilized level (primary pressure) by the pilot relief valve 102 when applied by the pilot pump 100. Accordingly, the shift of the spool of the valve 160 toward the stretching position can be restricted reliably, permitting the system to perform the function of reusing the discharged fluid for the arm cylinder 37 with good stability.

On the other hand, when the arm cylinder 37 is heavily loaded, that is, if the pressure supplied to the arm cylinder 37 is not lower than the pressure predetermined for the sequence valve 170, the sequence valve 170 is changed over to the open position by the main channel pressure acting on the receiving portion 170 via the channels 56, 57 and pilot channel 175. Accordingly, the receiving portion 183 communicates with the reservoir 25 through the pilot channels 173, 174 and open position of the sequence valve 170, thereby cancelling the restriction on stroke of the valve spool 161 toward the stretching position.

At this time, the arm cylinder 37 is in operation for extending. Accordingly, the pilot pressure delivered from the pilot valve 150 and acting through the pilot channel 156 on the receiving portion 182 of the control valve 160 forces the spool 161 inside the control valve 160 further rightward to a full extent to the second stretching position N while retracting the piston 193. The channels 162, 164 of the spool 161 are blocked by the land of the valve case 180, and the channel 187 communicates with the channel 185 through a reduced diameter portion 169 formed in the spool 161.

As a result, the fluid discharged from the rod-side fluid chamber 37B of the arm cylinder 37 is entirely returned to the reservoir 25 via the channel 187, reduced diameter portion 169 of the spool 161, channel 185 and return channel 75. In this case, the changing-over pilot pressure is acting on the receiving portion 182 of the control valve 160 toward one end of the spool, whereas the receiving portions 181, 183 on the opposite side are free of any pilot pressure. Consequently, no axial reaction acts on the spool 161, which therefore remains stable Furthermore, there is no likelihood of the arm cylinder 37 hunting.

The fluid control system shown in FIGS. 4 and 5 is adapted to selectively perform the fluid reusing function according to whether the load is small when the arm cylinder 37 is to be stretched. However, the mechanism for performing the reusing function is usable also when the arm cylinder 37 is to be contracted or for operating other actuators.

INDUSTRIAL APPLICATION

As desribed above, the fluid control system embodying the invention is useful for power shovels and like civil engineering working machines for controlling the machine for running and operating the work device, for maintaining the machine body in straight travel, for controlling the working device actuator necessitating an increased flow of fluid thereinto, for controlling the working device actuator having a need to compensate for the flow of fluid thereinto and further for controlling the working device actuator subjected to varying loads. The system is especially suitable for controlling at least two actuators each for single operation or for simultaneous operation.

What is claimed is:

1. A fluid control system for a power shovel comprising two main pumps, two control valve groups each having a running control valve at the upstream side thereof and working device control valves arranged downstream from the respective running control valve, one of said working device control valves having a need to compensate for the amount of flow of the fluid thereinto, said fluid control system further comprising a flow-dividing selector valve mechanisms respectively connected to the main pumps via main channels and being selectively operable to a first position wherein the main channels individually communicate with upstream sides of the respective running control valves and to a second position wherein one of the main channels is allowed to communicate with both of the running control valves and another of the main channels is allowed to communicate downstream from the two running control valves and upstream of the working device control valves, confluent selector valve mechanisms each connected to an intermediate portion of a channel extending from a downstream side of the running control valve of one control valve group to an upstream side of a working device control valve of the other control valve group, each of said confluent selector valve mechanisms being selectively opened to permit fluid passage by a signal for operating the working device control valve of the other control valve group to selectively perform a confluence function or blocking function, a reservoir, and shutoff valve mechanisms each connected to an intermediate portion of a fluid return channel extending from a downstream side of a downstream one of the working device control valves in each group to the reservoir, whereby the confluent selector valve mechanism of the group having a working device control valve which has a need to compensate for the amount of flow of the fluid thereinto receives a signal for closing the fluid passage working device control valve.

2. A fluid control system as defined in claim 1 wherein the control valves of the control valve groups, the flow-dividing selector valve mechanism, the confluent selector valve mechanisms and the shutoff valve mechanisms are joined together in the form of a valve unit.

3. A fluid control system as defined in claim 1 wherein the flow-dividing selector valve is provided with a receiving portion for changing over the flow-dividing selector valve to the second position in response to a signal for operating the two running control valves and at least one working device-control valve at the same time and for otherwise holding the flow dividing selector valve in the first position.

4. A fluid control system as defined in claim 1 wherein the flow-dividing selector valve mechanism has a flow-dividing selector valve provided with a restrictor for maintaining, when the flow dividing selector valve is in the second position, communication between an internal passage communicating with one of the main pumps and an internal passage communicating with the other main pump.

5. A fluid control system as defined in claim 1 wherein the flow-dividing selector valve mechanism includes a pilot-operated two-position directional control valve which is changed over to the second position when a pilot pressure input is given to a receiving portion thereof and is otherwise held in the first position.

6. A fluid control system as defined in claim 1 wherein the confluent selector valve mechanism of each control valve group has a confluent selector valve performing the confluence function when receiving a signal for operating the working device control valve of the other group and having a need for an increased amount of flow of the fluid therein.

7. A fluid control system as defined in claim 5 wherein each of the confluent selector valve mechanism is a valve selectively operable and having a second position for opening an internal passage to perform the confluence function and a first position for closing the internal passage to perform the blocking function.

8. A fluid control system as defined in claim 7 wherein each of the confluent selector valve mechanisms is a pilot-operated two-position blocking valve which is changed over to the second position when a pilot pressure input is given to a receiving portion thereof and is otherwise held in the first position.

9. A fluid control system as defined in claim 1 wherein each said is changed over to a second position for closing an internal passage thereof when a receiving portion thereof receives a signal for operating the working device control valve of the other group and having a need for an increased amount of flow of the fluid thereinto and is otherwise held in a first position for opening the internal passage.

10. A fluid control system as defined in claim 9 wherein the shutoff valve is a pilot-operated two-position valve which is changed over to the second position to open the internal passage when a pilot pressure input is given to the receiving portion and is otherwise held in the first position to close the internal passage.

11. A fluid control system as defined in claim 1 wherein the working device control valves comprise a boom control valve communicating with a boom cylinder, a bucket control valve communicating with a bucket cylinder, an arm control valve communicating with an arm cylinder, and a swivel control valve communicating with a swivel motor unit.

12. A fluid control system as defined in claim 11 wherein one of the control valve groups comprises one of the running control valves, the boom control valve and the bucket control valve, and the other control valve group comprises the other running control valve, the arm control valve and the swivel control valve.

13. A fluid control system as defined in claim 1 wherein the working device control valve having a need for an increased amount of flow of the fluid thereinto is a boom control valve communicating with a boom cylinder.

14. A fluid control system as defined in claim 1 wherein the working device control valve having a need for an increased amount of flow of the fluid thereinto is a boom control valve communicating with a boom cylinder, and the confluent selector valve mechanism connected thereto performs the confluence function in response to a control signal to be sent to the boom control valve for a change-over to the position to stretch the boom cylinder.

15. A fluid control system as defined in claim 1 wherein the working device control valve having a need for an increased amount of flow of the fluid thereinto is an arm control valve communicating with an arm cylinder.

16. A fluid control system as defined in claim 1 wherein the working device control valve having a need for an increased amount of flow of the fluid thereinto is an arm control valve communicating with an arm cylinder, and the confluent selector valve mechanism connected thereto performs the confluence function in response to a control signal to be sent to the arm control valve for a change-over to the position to contract the arm cylinder.

17. A fluid control systems as defined in claim 1 wherein each of the working device control valves is a three-position directional control valve operable by a pilot pressure.

18. A fluid control system as defined in claim 1 wherein the working device control valve having a need to compensate for the amount of flow of the fluid thereinto is a boom control valve communicating with a boom cylinder.

19. A fluid control system as defined in claim 1 wherein the working device control valve having a need to compensate for the amount of flow of the fluid thereinto is a boom control valve communicating with a boom cylinder, and the confluent selector valve mechanism of the control valve group including the boom control valve has a receiving portion for cancelling the confluence function in response to a signal thereto.

20. A fluid control system as defined in claim 1 wherein the main pumps are each a variable capacity pump to be driven by an engine.

21. A fluid control system as defined in claim 1 which further has a pilot pump, pilot channels communicating with the pilot pump through resistors respectively, pilot operated directional control valves operatively connected to the respective running control valves, and pilot operated directional control valves operatively connected to the working device control valves respectively, each of the directional control valves operatively connected to the respective running control valves being a valve selectively operable, having an internal passage thereof closed when neutral and having the internal passage thereof opened when in a changed-over position, each of the directional control valves operatively connected to the respective working device control valves being a valve selectively operable, having an internal passage thereof opened when neutral and having the internal passage thereof closed when in a changed-over position, the directional control valves being connected to the respective pilot channels in tandem, the system further having pilot channels for delivering from the downstream side of the directional control valves operatively connected to the respective running control valves a pilot pressure for changing over the flow-dividing selector valve mechanism to the second position.

22. A fluid control system as defined in claim 1 wherein a working device control valve communicating with an actuator to be subjected to varying loads has a control valve spool selectively shiftable to one of a neutral position, one work position and another work position, and receiving portions for shifting the spool from the neutral position to either of the work positions, the control valve having a first work position provided with an internal passage for the discharged fluid from the actuator to flow therethrough into the actuator again, and a second work position provided with an internal passage for the discharged fluid to return therethrough to the reservoir.

23. A fluid control system as defined in claim 22 wherein the working device control valve has a spool stroke restricting mechanism for restricting the shift of the spool to the first work position.

24. A fluid control system as defined in claim 22 wherein the working device control valve is a pilot-operated control valve wherein the spool is shiftable by a pilot pressure input given to each of the receiving portions and has a pilot channel connected to a receiving portion of a spool stroke restricting mechanism for restricting the shift of the spool toward said one work position side to the first work position, a pilot pump in communication with the pilot channel through a restrictor, and a sequence valve connected between the pilot channel and the reservoir and switchable between a first position for permitting a pilot channel downstream from the restrictor to communicate with the reservoir and a second position for blocking the communication, the sequence valve having a receiving portion for holding the sequence valve in the first position when the pressure of the main channel is not lower than a predetermined pressure and for switching the sequence valve to the second position when the channel pressure is lower than the predetermined pressure, the receiving portion being connected to a pilot channel branching from a channel communicating with the main pumps at the upstream side of the control valve for deriving the pressure of the main channel.

* * * * *